United States Patent
Yamakura

(10) Patent No.: US 8,418,573 B2
(45) Date of Patent: Apr. 16, 2013

(54) BALL-SCREW SPLINE

(75) Inventor: Wataru Yamakura, Tokyo (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 13/254,102

(22) PCT Filed: Feb. 24, 2010

(86) PCT No.: PCT/JP2010/052832
§ 371 (c)(1),
(2), (4) Date: Aug. 31, 2011

(87) PCT Pub. No.: WO2010/113572
PCT Pub. Date: Oct. 7, 2010

(65) Prior Publication Data
US 2012/0024093 A1    Feb. 2, 2012

(30) Foreign Application Priority Data
Mar. 31, 2009  (JP) .................. 2009-084640

(51) Int. Cl.
*F16H 25/20*    (2006.01)

(52) U.S. Cl.
USPC .................. 74/89.23; 74/424.82; 384/43

(58) Field of Classification Search .................. 74/89.23, 74/89.29, 89.31, 89.34, 424.82; 384/43
See application file for complete search history.

(56) References Cited

U.S. PATENT DOCUMENTS

| | | | | |
|---|---|---|---|---|
| 2,874,579 A | * | 2/1959 | Geyer | 74/57 |
| 3,404,581 A | * | 10/1968 | Kraus | 74/89.35 |
| 3,989,223 A | * | 11/1976 | Burkhardt et al. | 251/58 |
| 4,614,128 A | * | 9/1986 | Fickler | 74/89.31 |
| 5,094,118 A | * | 3/1992 | Morita | 74/89.31 |
| 5,273,381 A | * | 12/1993 | Shirai | 409/219 |
| 6,464,034 B1 | * | 10/2002 | Toda et al. | 180/444 |
| 6,814,190 B1 | | 11/2004 | Oischewski et al. | |
| 2010/0275711 A1 | * | 11/2010 | Shige et al. | 74/424.82 |
| 2011/0138949 A1 | * | 6/2011 | Himmelmann | 74/424.83 |

FOREIGN PATENT DOCUMENTS

| | | |
|---|---|---|
| JP | 3-43156 U | 4/1991 |
| JP | 11-303966 A | 11/1999 |
| JP | 2000-158144 A | 6/2000 |
| JP | 2002-515573 A | 5/2002 |
| JP | 2005-014087 A | 1/2005 |

OTHER PUBLICATIONS

International Search Report of PCT/JP2010/052832, mailing date Apr. 13, 2010.

* cited by examiner

*Primary Examiner* — William C Joyce
(74) *Attorney, Agent, or Firm* — Westerman, Hattori, Daniels & Adrian, LLP

(57) ABSTRACT

A ball-screw spline includes: a screw shaft; a ball-screw nut engaged with the screw shaft via balls; and a spline nut assembled to an outside of the ball-screw nut via balls to reciprocate in an axial direction of the ball-screw nut. The ball-screw nut includes a screw portion and an extended portion formed integrally, with the same outer diameter. The screw portion has an inner peripheral surface including a load-rolling groove forming a load path for the balls together with a ball rolling groove on the screw shaft side; and a ball return path coupling adjacent valley portions of the load-rolling groove to form a circulation path corresponding to one loop around the screw shaft. The ball-screw nut has an outer peripheral surface including a ball rolling groove for the spline nut, the ball rolling groove being formed over a range corresponding to the screw portion and the extended portion.

6 Claims, 5 Drawing Sheets

BALL-SCREW SPLINE

TECHNICAL FIELD

The present invention relates to a ball-screw spline to be used, for example, in an electric actuator capable of obtaining a desired stroke amount by driving of an electric motor.

BACKGROUND ART

For example, an electric actuator disclosed in JP 11-303966 A is known as an electric actuator using the ball-screw spline of this type. The ball-screw spline includes a cylindrical cylinder, a spline nut arranged at one end of the cylinder, a hollow spline shaft arranged in a hollow portion of the cylinder and guided by the spline nut, and a screw shaft arranged in a hollow portion of the spline shaft.

A screw groove in which balls roll is helically formed in an outer peripheral surface of the screw shaft, and the screw shaft is rotationally driven by a motor fixed to another end of the cylinder. Meanwhile, one end of the spline shaft serves as a ball-nut portion, and a screw groove facing the above-mentioned screw groove of the screw shaft is formed in an inner peripheral surface of the ball-nut portion. The spline shaft is threadedly engaged with the screw shaft through intermediation of a large number of balls.

Further, a plurality of rows of ball rolling grooves are formed in an outer peripheral surface of the spline shaft along an axial direction. The spline nut is assembled to the spline shaft through intermediation of a large number of balls which roll in the ball rolling grooves.

In order to form an infinite circulation path for the balls with respect to the ball-nut portion of the spline shaft, a cutout flat-surface portion is formed on an outer peripheral surface of the one end of the spline shaft. To the cutout flat-surface portion, there is fixed a return tube for returning the balls rolling up to one end of the screw groove of the ball-nut portion to another end of the screw groove. The return tube projects from the outer peripheral surface of the spline shaft to a radially outer side, and hence the ball rolling grooves formed in the outer peripheral surface of the spline shaft are provided within a range in which the ball rolling grooves do not overlap the ball-nut portion.

In the electric actuator structured as described above, when the screw shaft is rotated by the motor, the spline nut fixed to the cylinder functions as a rotation stopper for the spline shaft. Thus, the spline shaft threadedly engaged with the screw shaft moves in the axial direction in accordance with rotation of the screw shaft. That is, the spline shaft is moved by a stroke amount corresponding to a rotational amount of the screw shaft.

CITATION LIST

Patent Literature

Patent Literature 1: JP 11-303966 A

DISCLOSURE OF THE INVENTION

Problems to be Solved by the Invention

However, in the ball-screw spline as described above, the return tube of the ball-nut portion projects from the outer peripheral surface of the spline shaft, and hence the spline nut cannot move on the ball-nut portion of the spline shaft. In other words, the spline nut cannot move over the entire length of the spline shaft. Thus, it is necessary to set the entire length of the spline shaft to be larger as compared to the stroke amount of the spline shaft, which leads to upsizing of the electric actuator using the above-mentioned ball-screw spline.

Means for Solving the Problems

The present invention has been made in view of such a case, and it is therefore an object of the present invention to provide a ball-screw spline which contributes to downsizing of an entire electric actuator to a maximum extent through reduction of an entire length of a spline shaft, while securing a sufficient stroke amount of a spline nut with respect to the entire length of the spline shaft.

In order to achieve the above-mentioned object, the present invention provides a ball-screw spline, including: a screw shaft having an outer peripheral surface provided with a helical ball rolling groove; a ball-screw nut formed into a substantially cylindrical shape and threadedly engaged with the screw shaft through intermediation of a large number of balls; and a spline nut assembled to an outside of the ball-screw nut through intermediation of a large number of balls, and including an infinite circulation path for the large number of balls to freely reciprocate in an axial direction of the ball-screw nut.

The ball-screw nut includes a screw portion and an extended portion which are formed integrally with each other with the same outer diameter, and the screw portion has an inner peripheral surface provided with: a load-rolling groove facing the helical ball rolling groove on the screw shaft side so as to form a load path for the large number of balls together with the helical ball rolling groove; and a ball return path coupling adjacent valley portions of the load-rolling groove so as to form an infinite circulation path corresponding to one loop around the screw shaft.

The ball-screw nut has an outer peripheral surface provided with a ball rolling groove for the spline nut, the ball rolling groove for the spline nut being formed over a range corresponding to the screw portion and the extended portion at a position at which the ball rolling groove for the spline nut is prevented from overlapping the ball return path in a circumferential direction of the ball-screw nut.

Effects of the Invention

According to the ball-screw spline of the present invention, the screw portion and the extended portion of the ball-screw nut are formed integrally with each other with the same outer diameter, and further, the ball return path is formed in the inner peripheral surface of the screw portion. Thus, the members forming the infinite circulation path for the balls do not project from the outer peripheral surface of the ball-screw nut, and hence the spline nut is movable over the entire length of the ball-screw nut. That is, the stroke amount of the spline nut, which corresponds to the entire length of the ball-screw nut, can be secured. With this, the electric actuator using the ball-screw spline according to the present invention can be downsized.

MODE FOR CARRYING OUT THE INVENTION

In the following, detailed description is made of a ball-screw spline of the present invention with reference to the accompanying drawings.

Figure 1:
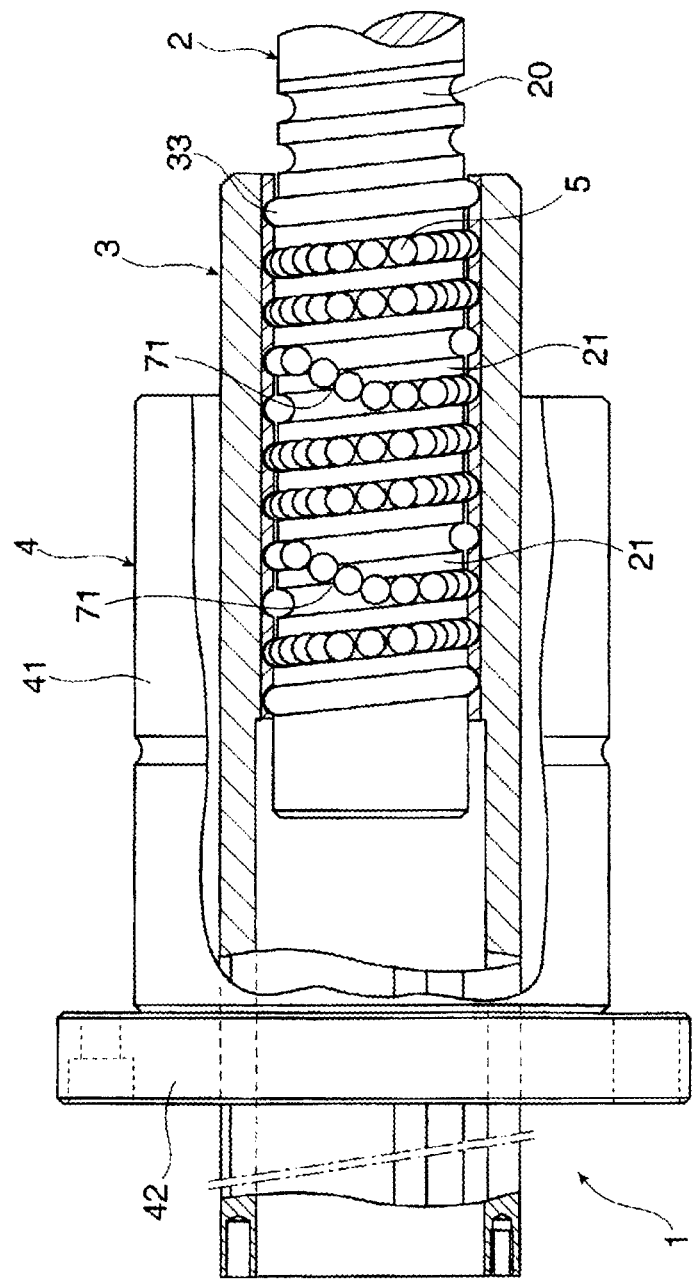
FIG. 1 A side view of a ball-screw spline in accordance with an embodiment of the present invention.
Figure 2:
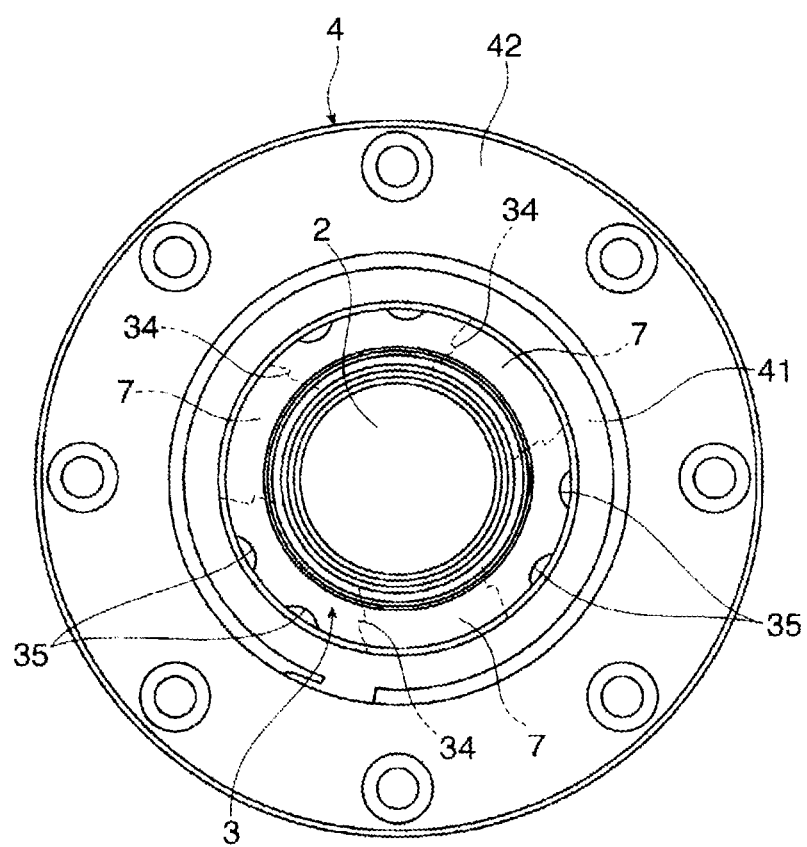
FIG. 2 A front view of the ball-screw spline illustrated in FIG. 1.

FIGS. 1 and 2 illustrate an example of a ball-screw spline to which the present invention is applied. FIG. 1 is a side view, and FIG. 2 is a front view.

A ball-screw spline 1 includes a screw shaft 2, a ball-screw nut 3 formed into a substantially cylindrical shape and threadedly engaged with the screw shaft 2 through intermediation of a large number of balls 5, and a spline nut 4 formed into a substantially cylindrical shape and assembled to an outside of the ball-screw nut 3 through intermediation of a large number of balls 6.

The screw shaft 2 includes a ball rolling groove 20, and the ball rolling groove 20 is helically formed with a predetermined lead along an outer peripheral surface of the screw shaft 2. Here, the term "lead" represents a distance by which the ball rolling groove 20 shifts in an axial direction of the screw shaft 2 in accordance with one rotation of the screw shaft 2. Further, peak portions 21 are formed between valley portions of the ball rolling groove 20 of the screw shaft 2.

Figure 3:
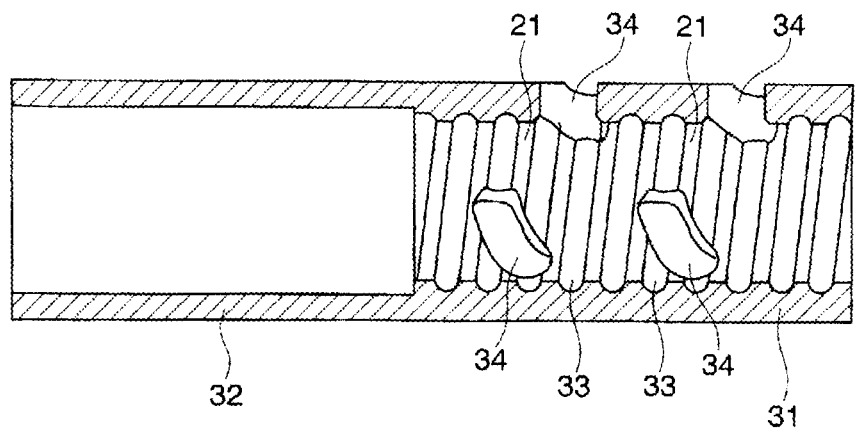
FIG. 3 A side sectional view in which a ball-screw nut is partially cut out.
Figure 4:
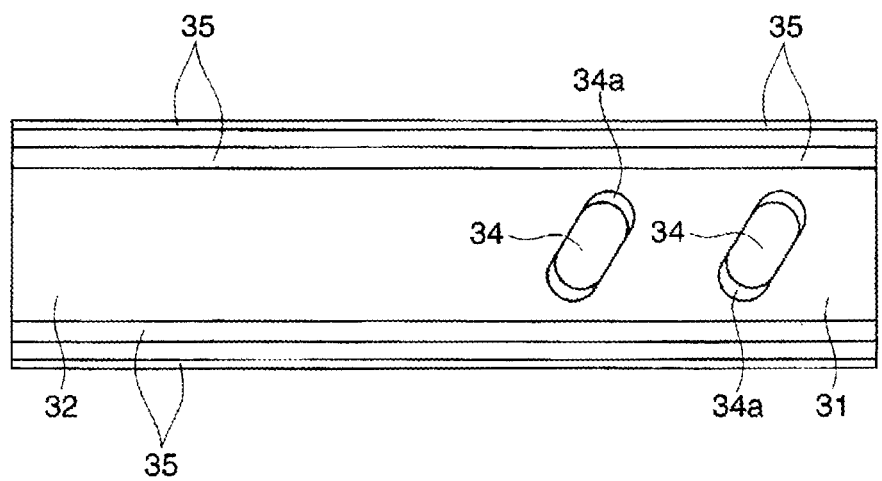
FIG. 4 plan view of an outer peripheral surface of the ball-screw nut.

FIGS. 3 and 4 illustrate the ball-screw nut. FIG. 3 is a side sectional view in which the ball-screw nut is partially cut out, and FIG. 4 is a plan view of an outer peripheral surface of the ball-screw nut.

The ball-screw nut 3 includes a screw portion 31 and an extended portion 32 which are formed integrally with each other with the same outer diameter. Each of the screw portion 31 and the extended portion 32 has a through-hole through which the screw shaft 2 passes. In an inner peripheral surface of the screw portion 31, there is helically formed a load-rolling groove 33 facing the ball rolling groove 20 of the screw shaft 2. The load-rolling groove 33 and the ball rolling groove 20 of the screw shaft 2 face each other, to thereby form a helical load path in which the balls 5 roll around the screw shaft 2 while bearing load.

Meanwhile, the screw portion 31 of the ball-screw nut 3 is provided with elongated insertion holes 34 into each of which a ball return member 7 described later is mounted. As illustrated in FIG. 2, the insertion holes 34 are arranged at equal intervals of 120 degrees in a circumferential direction of the ball-screw nut 3. Further, as illustrated in FIG. 3, two insertion holes 34 are provided in series along an axial direction of the ball-screw nut 3. In other words, six insertion holes 34 are provided in an outer peripheral surface of the screw portion 31 of the ball-screw nut 3. Further, at both rims in a longitudinal direction of each of the insertion holes 34, there are formed step portions 34a and 34a for engaging the ball return member 7.

Note that, FIG. 3 is a sectional view, and hence illustrates only four insertion holes 34 with respect to the ball-screw nut 3. Other two insertion holes 34 are positioned on the reader's side of the drawing sheet of FIG. 3, and hence not illustrated.

Figure 5:
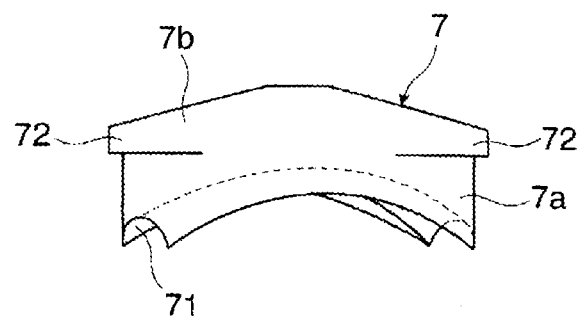
FIG. 5 A front view of an external appearance of a ball return member.
Figure 6:
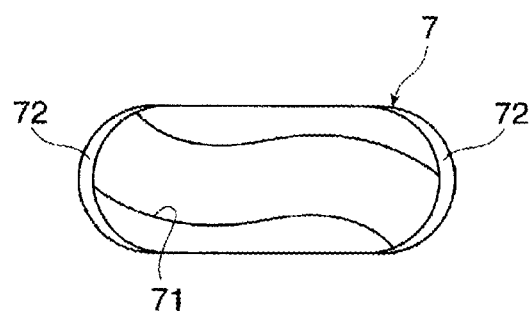
FIG. 6 A bottom view of the ball return member.

FIGS. 5 and 6 illustrate the ball return member 7. FIG. 5 is a front view of an external appearance of the ball return member 7, and FIG. 6 is a bottom view of the ball return member 7.

The ball return member 7 has a shape conforming to that of the insertion hole 34, and includes a ball return portion 7a having a ball return path 71 formed into an S-shape, and a fitting portion 7b having projecting portions 72 and 72 corresponding to the step portions 34a of the insertion hole 34. The fitting portion 7b is formed so that the ball return member 7 is completely accommodated without projecting from the outer peripheral surface of the ball-screw nut 3 when being mounted into the insertion hole 34 of the ball-screw nut 3 (refer to FIG. 2).

The ball return path 71 of the ball return portion 7a is formed into an S-shape, and changes an advancing direction of the balls 5 rolling in the ball rolling groove 20 of the screw shaft 2 toward the ball return member 7 so that the balls 5 climb over the peak portion 21 of the screw shaft 2. Thus, the balls 5 return into the valley portion of the ball rolling groove 20 preceding the original valley portion thereof by one lead. When the ball return member 7 is mounted to the insertion hole 34 of the ball-screw nut 3, the ball return path 71 of the ball return member 7 and the load path formed around the screw shaft 2 complete an infinite circulation path for the balls 5 as illustrated in FIG. 1, which corresponds to one loop around the screw shaft 2. When a relative rotational movement occurs between the ball-screw nut 3 and the screw shaft 2, the balls 5 circulate in the infinite circulation path, which causes the ball-screw nut 3 to move in the axial direction of the screw shaft 2.

Meanwhile, in the outer peripheral surface of the ball-screw nut 3, there are formed six ball rolling grooves 35 for the spline nut 4 along the axial direction while avoiding the insertion holes 34 (refer to FIG. 4). The ball rolling grooves 35 are arranged in pairs at 120 degrees in the circumferential direction of the ball-screw nut 3. In other words, in the circumferential direction of the ball-screw nut 3, the insertion holes 34 for the ball return members 7 and the ball rolling grooves 35 for the spline nut 4 are arranged alternately to each other (refer to FIG. 2). The ball rolling grooves 35 for the spline nut 4 are formed over the range corresponding to the screw portion 31 and the extended portion 32 of the ball-screw nut 3, that is, over the entire length of the ball-screw nut 3.

Figure 7:
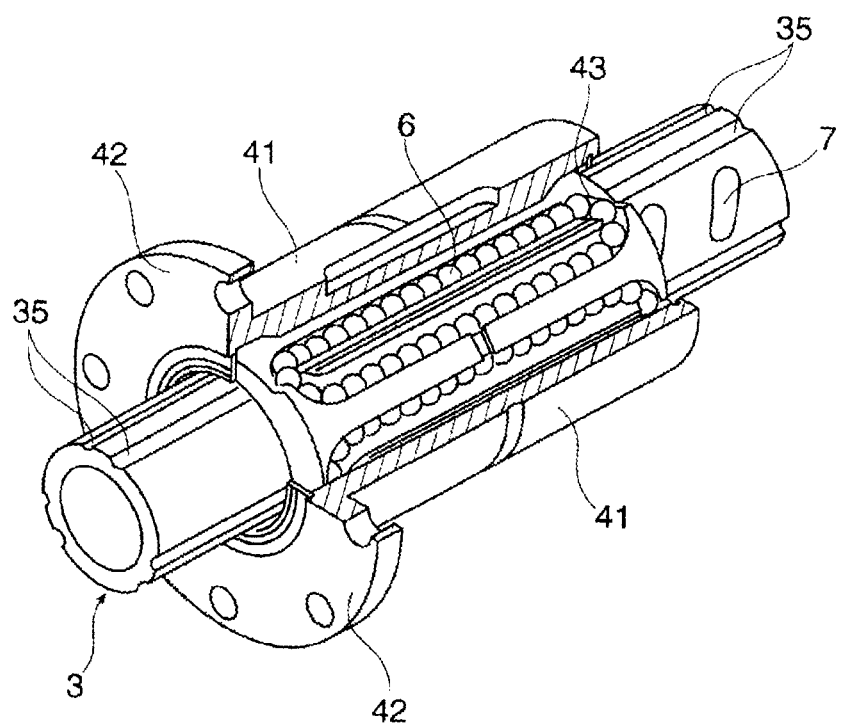
FIG. 7 A perspective view in which a spline nut illustrated in FIG. 1 is partially cut out.

FIG. 7 is a perspective view in which the spline nut 4 illustrated in FIG. 1 is partially cut out. The spline nut 4 includes a nut body 41, and a flange portion 42 for fixation of the spline nut 4 to a mechanical apparatus. Each of the nut body 41 and the flange portion 42 has a through-hole through which the ball-screw nut 3 passes. The flange portion 42 is provided with bolt holes to be used at the time of fixing the spline nut 4.

In an inner peripheral surface of the through-hole of the nut body 41 of the spline nut 4, which faces the ball-screw nut 3, there are formed infinite circulation paths 43 in which the balls 6 circulate infinitely. Each of the infinite circulation paths 43 includes a load linear groove facing the ball rolling groove 35 for the spline nut 4, which is formed in the outer peripheral surface of the ball-screw nut 3, a non-load linear groove formed parallel to the load linear groove, and ball deflection grooves for converting a rolling direction of the balls 6 by 180 degrees between the load linear groove and the non-load linear groove, and causing the balls 6 to come and go between those grooves. The entire region of the infinite circulation path 43 opens toward the ball-screw nut 3, and the balls 6 arranged in the infinite circulation path 43 circulate in the infinite circulation path 43 in a state of facing the ball-screw nut 3.

Preload is applied to the balls 6 rolling in the infinite circulation paths 43 while bearing load, and hence backlash between the ball-screw nut 3 and the spline nut 4 is eliminated. Even at the time of transmission of rotational torque from the spline nut 4 to the ball-screw nut 3, the ball-screw nut 3 can be advanced and retracted in the axial direction smoothly with high accuracy.

Here, the ball rolling grooves 35 for the spline nut 4 illustrated in FIG. 2 are formed in pairs. In this context, as long as preload is applied to the balls 6 rolling between the spline nut 4 and the ball-screw nut 3, the ball rolling grooves 35 for the spline nut 4 need not be formed in pairs. Thus, a single ball rolling groove 35 for the spline nut 4 may be formed.

The ball-screw spline 1 of the present invention, which is structured as described above, is used, for example, in an electric actuator capable of obtaining a desired stroke amount by driving of an electric motor. In that case, the ball-screw spline 1 is used as follows. That is, while the electric motor is coupled to another end of the screw shaft 2 so that the screw shaft 2 is rotationally driven, the spline nut 4 is fixed with bolts and the like to a housing of the electric actuator. In this case, when rotation is imparted to the screw shaft 2, the ball-screw nut 3 moves in accordance with a rotational amount of the screw shaft 2 because the ball-screw nut 3 is stopped from being rotated in the circumferential direction by the spline nut 4. In this way, the electric actuator can be moved by a desired stroke amount.

Further, according to the ball-screw spline 1 of the present invention, the ball return member 7 is mounted into the insertion hole 34 without projecting from the outer peripheral surface of the ball-screw nut 3. Thus, unlike conventional ball-screw splines, the movement of the spline nut 4 is not hindered by the ball return members 7 of the screw portion 31, and hence the spline nut 4 is movable over the entire length of the ball-screw nut 3. That is, a stroke amount of the spline nut 4, which corresponds to the entire length of the ball-screw nut 3, can be secured. Accordingly, the electric actuator using the ball-screw spline according to the present invention can be downsized.

Note that, the above-mentioned use of the ball-screw spline is merely an example. For example, instead of rotationally driving the screw shaft 2, rotation drive means may be provided with respect to the spline nut 4 so as to rotationally drive. In this way, a spiral movement may be imparted to the ball-screw nut.

The invention claimed is:

1. A ball-screw spline, comprising:
    a screw shaft having an outer peripheral surface provided with a helical ball rolling groove;
    a ball-screw nut formed into a substantially cylindrical shape and threadedly engaged with the screw shaft through intermediation of a first plurality of balls; and
    a spline nut assembled outside of the ball-screw nut through intermediation of a second plurality of balls, and including an infinite circulation path for the second plurality of balls to freely reciprocate over the entire length of an axial direction of the ball-screw nut,
    wherein the ball-screw nut comprises a screw portion and an extended portion which are formed integrally with each other with the same outer diameter,
    wherein the screw portion has an inner peripheral surface comprising
        a load-rolling groove facing the helical ball rolling groove on the screw shaft side so as to form a load path for the first plurality of balls together with the helical ball rolling groove; and
        a ball return path coupling adjacent valley portions of the load-rolling groove so as to form an infinite circulation path for the first plurality of balls, corresponding to one loop around the screw shaft,
    wherein the ball-screw nut has an outer peripheral surface provided with a ball rolling groove for the spline nut, the ball rolling groove for the spline nut being formed over a portion of the ball-screw nut corresponding to the screw portion and the extended portion, and
    wherein the ball rolling groove for the spline nut is formed at a position which does not overlap the ball return path, in a circumferential direction of the ball-screw nut.

2. The ball-screw spline according to claim 1,
    wherein the ball-screw nut includes a plurality of the infinite circulation paths for the first plurality of balls,
    wherein a plurality of the ball return paths, corresponding respectively to the plurality of the infinite circulation paths for the first plurality of balls, are arranged at equal intervals in the circumferential direction of the ball-screw nut, and
    wherein the ball rolling groove for the spline nut is positioned between the plurality of the ball return paths arranged at the equal intervals.

3. The ball-screw spline according to claim 2,
    wherein the plurality of ball return paths are each formed in one of a plurality of return members,
    wherein the ball-screw nut is provided with a plurality of insertion holes into which the plurality of return members are mounted.

4. The ball screw spline according to claim 3, wherein each of the plurality of return members is completely accommodated within the ball-screw nut, such that each of the plurality of return members does not project from the outer peripheral surface of the ball-screw nut.

5. The ball-screw spline according to claim 1,
    wherein the ball return path is formed in a return member, and
    wherein the ball-screw nut is provided with an insertion hole into which the return member is mounted.

6. The ball-screw spline according to claim 5, wherein the return member is completely accommodated within the ball-screw nut, such that the return member does not project from the outer peripheral surface of the ball-screw nut.

* * * * *